US008696546B2

(12) United States Patent
Nicolaou et al.

(10) Patent No.: US 8,696,546 B2
(45) Date of Patent: Apr. 15, 2014

(54) IMAGING SYSTEM

(75) Inventors: Marios Nicolaou, London (GB); Adam James, London (GB); Guang-Zhong Yang, Epsom (GB); Ara Darzi, Gerrards Cross (GB)

(73) Assignee: Smart Surgical Appliances Ltd. (GB)

( * ) Notice: Subject to any disclaimer, the term of this patent is extended or adjusted under 35 U.S.C. 154(b) by 1141 days.

(21) Appl. No.: 12/088,472

(22) PCT Filed: Mar. 17, 2006

(86) PCT No.: PCT/GB2006/000979
§ 371 (c)(1),
(2), (4) Date: Oct. 15, 2008

(87) PCT Pub. No.: WO2007/036681
PCT Pub. Date: Apr. 5, 2007

(65) Prior Publication Data
US 2009/0030275 A1    Jan. 29, 2009

(30) Foreign Application Priority Data

Sep. 28, 2005   (GB) .................................. 0519769.4

(51) Int. Cl.
*A61B 1/04*        (2006.01)
*A61B 1/06*        (2006.01)

(52) U.S. Cl.
USPC ............................ 600/109; 600/104; 600/160

(58) Field of Classification Search
USPC ................. 600/109, 173, 182, 160, 117, 104; 382/266
See application file for complete search history.

(56) References Cited

U.S. PATENT DOCUMENTS

| 4,980,763 | A | * | 12/1990 | Lia ................................ 348/67 |
| 5,061,995 | A | * | 10/1991 | Lia et al. ......................... 348/68 |
| 5,070,401 | A | * | 12/1991 | Salvati et al. ................... 348/141 |
| 5,148,477 | A | * | 9/1992 | Neely et al. .................... 382/107 |
| 5,202,758 | A | * | 4/1993 | Tamburrino .................... 348/68 |
| 5,669,871 | A | * | 9/1997 | Sakiyama ....................... 600/117 |
| 6,097,848 | A | * | 8/2000 | Salvati ........................... 382/266 |
| 6,563,105 | B2 | * | 5/2003 | Seibel et al. ................. 250/208.1 |
| 2002/0139920 | A1 | | 10/2002 | Seibel et al. |
| 2005/0027167 | A1 | * | 2/2005 | Chatenever et al. ........... 600/173 |
| 2005/0254720 | A1 | * | 11/2005 | Tan et al. ........................ 382/254 |
| 2011/0201889 | A1 | * | 8/2011 | Vayser et al. ................... 600/182 |

OTHER PUBLICATIONS

Hanna et al., Shadow Depth Cues and Endoscopic Task Performance, Oct. 2002, Archives of Surgery, vol. 137, No. 10, pp. 1166-1169.
Hubona et al., The Effects of Cast Shadows and Stereopsis on Performing Computer-Generated Spatial Tasks, Jul. 2004, IEEE Transactions on Systems, Man and Cybernetics—Part A: Systems and Humans, vol. 34, No. 4, pp. 483-493.

(Continued)

*Primary Examiner* — Philip R Smith
*Assistant Examiner* — William Chou
(74) *Attorney, Agent, or Firm* — Brooks Kushman P.C.

(57) ABSTRACT

A monoscopic imaging system, for example a minimally invasive surgery imaging system, is provided which includes an image capture device for capturing images of a monoscopic, for example endoscopic, field of view, an auxiliary light source operable such that an object within the field of view casts a shadow, an image processor operatively connected to the image capture device and operable to detect shadow pixels in the images corresponding to the shadow and to enhance the shadow in the images. The system is of particular, although not exclusive, application to laparoscopic surgery.

10 Claims, 3 Drawing Sheets

(56) References Cited

OTHER PUBLICATIONS

Huertas et al, Detecting Buildings in Aerial Images, 1988, Computer Vision, Graphics and Image Processing, vol. 41, pp. 131-152.

Irvin et al., Methods for Exploiting the Relationship Between Buildings and Their Shadows in Aerial Imagery, Nov./Dec. 1989, IEEE Transactions on Systems, Man and Cybernetics, vol. 19, No. 6, pp. 1564-1575.

Kelsey, Detection of Visual Information, 1993, The Perception of Visual Information, Chapter 2, eds. Hendee and Wells, Second Edition, pp. 33-55.

Liow et al., Use of Shadows for Extracting Buildings in Aerial Images, 1990, Computer Vision, Graphics and Image Processing, vol. 49, pp. 242-277.

Lo et al., Neuro-Fuzzy Shadow Filter, May 2002, Computer Vision-ECCV 2002, Proceedings of the 7th European Conference on Computer Vision, Demark, Part III, vol. 2352, pp. 381-392.

Mishra et al., Optimum Shadow-Casting Illumination for Endoscopic Task Performance, Aug. 2004, Archives of Surgery, vol. 139, pp. 889-892.

Nicolaou et al., Invisible Shadow for Navigation and Planning in Minimal Invasive Surgery, 2005, International Society and Conference Series on Medical Image Computing and Computer-Assisted Intervention(MICCAI), Lecture Notes in Computer Science, vol. 3750, pp. 25-32.

Tendick et al., Sensing and Manipulation Problems in Endoscopic Surgery: Experiment, Analysis and Observation, Winter 1993, Presence, vol. 2, No. 1, pp. 66-80.

Thompson et al., Shadow Stereo-Locating Object Boundaries Using Shadows, 1987, Proceedings of the 6th National Conference on Artificial Intelligence, Association for the Advancement of Artificial Intelligence(AAAI), pp. 761-766.

Wanger et al., Perceiving Spatial Relationships in Computer-Generated Images, May 1992, IEEE Computer Graphics & Applications, vol. 12, No. 3, pp. 44-58.

Gibson, The Perception of the Visual World, 1974, Greenwood Press (Westport, Conn.), pp. 90-99.

Tobii Technology, User Manual, Tobii Eye Tracker and ClearView Analysis Software, Feb. 2006.

Schurr et al., Human Sense of Vision: A Guide to Future Endoscopic Imaging Systems, Oct. 1996, Minimally Invasive Therapy and Allied Technologies, Blackwell Science, vol. 5, pp. 410-418.

Salvador et al., Shadow Identification and Classification Using Invariant Color Models, May 7, 2001, Proceedings of the 2001 IEEE International Conference on Acoustics, Speech and Signal Processing, vol. 3, pp. 1545-1548.

Xu et al., Segmentation and Tracking of Multiple Moving Objects for Intelligent Video Analysis, Jul. 2004, British Telecom Technology Journal, vol. 22, No. 3, pp. 140-150.

Cucchiara et al., Detecting Moving Objects, Ghosts and Shadows in Video Streams, Oct. 2003, IEEE Transactions on Pattern Analysis and Machine Intelligence, vol. 25, No. 10, pp. 1337-1342.

International Search Report, PCT/GB2006/000979, pp. 1-4.

\* cited by examiner

IMAGING SYSTEM

CROSS-REFERENCE TO RELATED APPLICATIONS

This application is the U.S. national phase of PCT Appln. No. PCT/GB2006/000979 filed on Mar. 17, 2006, the disclosure of which is incorporated in their entirety by reference herein.

TECHNICAL FIELD

The present invention relates to the enhancement of depth perception in a filed of view using a shadow cue. In particular, although not exclusively, the invention relates to enhancing depth perception in an operative field imaging system.

BACKGROUND

Over the last decade, minimally invasive surgery (MIS) has attained great popularity and acceptance among surgeons and patients alike. One example is laparoscopic surgery. However, MIS requires a high degree of competency from the surgeon due to the presence of a number of constraints, including limited vision. The surgeon is required to reconstruct the 3D operative field and perform instrument navigation through the narrow monoscopic two-dimensional (2D) field of view provided by the endoscope.

The perceptual cues that a surgeon may use to navigate the operative field are complex, and are often classified as primary (physiological) cues, such as binocular disparity, convergence and accommodation, and secondary (pictorial) cues, such as linear perspective, shading and shadow. The monoscopic field-of-view provided by an endoscope, for example a laparoscope, limits the 3D perception by projecting a scene onto a 2D plane. It has been observed that surgeons tend to compensate for the lack of depth perception by developing new strategies such as groping forward and backward with instruments to gauge the relative depths of organs by touching them. The combined visual and haptic feedback helps to confirm the instrument position and orientation.

This navigation approach, however, is not ideal particularly when undertaking delicate surgical manoeuvres that require subtle control of instruments which must be performed slowly and accurately enough to avoid damaging the tissues in contact.

Generally, there is always a constant requirement for surgery to become safer. This is particularly true in the current climate of clinical governance. Practically, safety can be achieved by better training as well as by reducing the constraints set by the nature of MIS. Improving 3D visualization and ultimately facilitating instrument navigation and manoeuvrings should hence be a priority.

Advances in true stereoscopic surgery aim to improve 3D perception, but such systems have practical limitations with respect to their use as they tend to be extremely expensive and not widely available. More importantly it has been demonstrated that these systems do not significantly improve endoscopic task performance, see for example R K Mishra, G B Hanna, S I Brown, A Cuschieri; Optimum Shadow-Casting Illumination for Endoscopic Task Performance; Arch. Surg 139: p889, Aug. 2004.

One of the primary cues that visual systems utilize to infer depth is shadow. Shadow can provide useful information about object shapes, relative 3D position, and surface characteristics within a scene. However, this visual cue is unavailable with MIS due to the coaxial alignment of the lens and the light source of traditional endoscopes. Under this setup, the operative field is generally shadowless. It has been shown in other studies that inducing shadow by the introduction of a secondary light source within the surgical field improves endoscopic task performance. See for example Mishra et al, cited above.

A first known prior art arrangement for introducing shadows in the operative field is disclosed in Mislra et al cited above. The operative field is accessed by an endoscope through a first cannula and by a surgical tool through a second canlula. A secondary light source is introduced through a third cannula placed above the tip of the surgical instrument or to the side of it. Each light source is fed by an independent halogen lamp. When testing the set-up on surgical trainees using an artificial surgical task, the shortest execution time and the least number of errors was found for a shadow cast by the overhead secondary light source producing a dark shadow. However, such a dark shadow also significantly obscures the operative field covered by the shadow.

An alternative set up for producing shadows in an endoscopic operative field is disclosed in M G Schurr, G Buess, W Klunert, E Flemming, H Hermeking & T Gumb; Human Sense of Vision: A guide to future endoscopic imaging systems; Min Invas Ther & Allied Technol 5: 410-418, 1996. The set-up employs a sideways looking endoscope with a primary light source illuminating the surgical field at an angle to the axis of the endoscope (and along its optic axis to the side) and a secondary light source provided by an illumination cannula with light bundles integrated into the shaft. The secondary light source provides a diffuse illumination which is off-axis with respect to the optical axis of the endoscope and thus produces shadows in the operative field.

Both approaches described above are problematic because, as shown by Mishra et al, optimum task performance requires a dense shadow. In the study of Mishra et al. the optimal shadow required a secondary light source much stronger than the primary light source (25000 lux and 6250 lux, respectively).

This means that, in the set ups of Mishra et al. and Schurr et al, the shadow cast by the surgical tool will obscure part of the visual field. Moreover, high intensity lamps are required for both the primary and secondary light source.

SUMMARY

By detecting and enhancing the shadow cast by an object within the field of view, the auxiliary light source can be of low intensity. Even more advantageously, the shadow produced by a low intensity light source can be so faint that it is hardly noticeable when not enhanced. Thus, the user can select between a field of view not obscured by a shadow and a field of view with the secondary depths cue provided by an enhanced shadow.

Advantageously, a motion detector may be connected to the image processor such that shadows are enhanced only when motion of the object, which may be a surgical instrument, is detected. Shadows will be automatically "switched on" when the user navigates in, for example, an endoscopic operative field of view and provide an unobscured view substantially without a shadow when the object or instrument is used at a desired site in the operative field. Movement may be detected from the captured images or a motion detector may be operatively connected to, for example, a surgical instrument.

The image processor may include a set of image filters including an intensity filter and a colour filter and may combine the output of each filter in the set to detect shadow pixels.

Advantageously, by using filters of different kinds, the shadow detection is more adaptable and can be used in a wider range of image situations.

Following shadow detection, the shadow may be enhanced, for example by multiplying the value of pixels detected to be shadow pixels by a predetermined factor or by setting the pixel to a predetermined value.

Advantageously, the auxiliary light source includes a cannula for accepting an endoscope or a surgical instrument, such that the number of incisions required when the system is used is minimised. The cannula may include an optical fibre bundle secured at one end of the cannula to illuminate the field of view and the bundle may be secured at another end to a light distributing junction arranged to split incoming light into a component for a light source of an endoscope and a diverted component for the auxiliary light source. Advantageously, only a single lamp is thus needed. The intensity of the diverged component may be regulated using a regulator of the light distribution junction. In one embodiment, the cannula includes one or more light emitting diodes secured thereto such as to be operable to illuminate the field of view. Advantageously, this embodiment dispenses with the need for a fibre optics connection and the auxiliary light source need only be connected to a (possibly low voltage) power source to power the light emitting diodes. The use of light emitting diodes is enabled by the low light power requirements of the auxiliary source because a faint shadow is sufficient since it is enhanced by the image processor.

The light source may emit light substantially in a narrow wavelength band which is narrower than the band of a main light source or may emit light in the non-visible part of the spectrum. In that way, the light from the auxiliary light source can be filtered out by a suitable filter when the shadow is not enhanced.

If two or more surgical instruments are to be used with the system, the cannula for each tool may be equipped with an auxiliary light source as described above and the cannulae may then be located relatively to each other such that the auxiliary light source associated with each cannula produces a shadow for at least one of the surgical instruments associated with the other cannula.

BRIEF DESCRIPTION OF THE DRAWINGS

The embodiments of the invention are now described by way of example only and with reference to the appended figures in which.

DETAILED DESCRIPTION

In overview, embodiments of the invention provide a new framework for improving depth perception, in particular for minimally invasive surgery, by introducing one or more auxiliary light sources that generates a faint shadow which in turn is digitally enhanced to provide depth cues for the surgeon. A faint shadow is meant to describe a shadow which is weak enough such that it does not interfere with the perception of a field of view in places where a shadow is cast.

Figure 1:
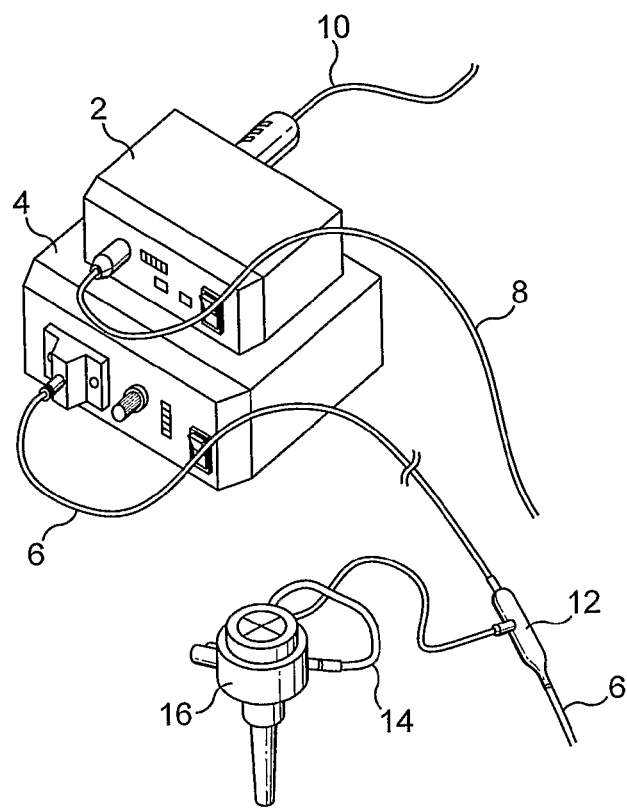
FIG. 1 depicts a MIS imaging system according to an embodiment of the invention.

FIG. 1 is a schematic representation of a MIS imaging system set-up comprising an imaging unit 2 and a light source unit 4. Light travels to an endoscope via a fibre optic bundle or light guide 6. A video image is captured from the endoscope and transmitted through a video cable 8 to the imaging unit 2. There it is processed and an output 10 is transmitted to a video monitor, which is viewed by the surgeon. Video signals are transmitted to the monitor from the image processing unit 2 using a standard composite video connection.

It is understood that the endoscope may transfer captured light to the imaging unit 2 instead of video signals, in which case the cable 8 would be replaced by a fibre optic light guide and the imaging unit 2 would include an image sensor.

In one embodiment, the auxiliary light source is implemented by introducing a light distributing junction 12 that interrupts the existing fibre optic bundle 6 prior to entering the endoscope. At the junction 12 light is split into two components. One beam of light continues down towards the camera with the remaining light being redistributed down a secondary light guide 14.

The secondary light guide connects to a cannula 16, which provides an auxiliary source of light to illuminate the operative cavity inside the patient.

Figure 2:
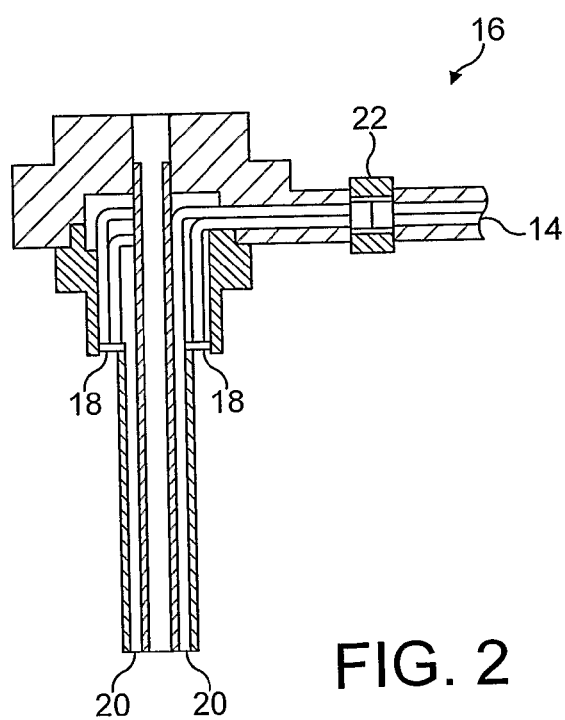
FIG. 2 depicts a cannula including an auxiliary light source.
Figure 3:
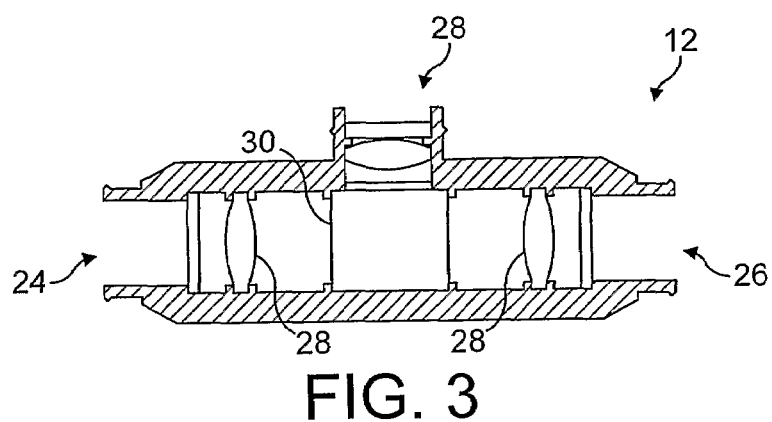
FIG. 3 depicts a cross section through a light distribution junction.

The cannula is of a type currently used in endoscopic surgery as a means by which to safely insert instruments into the operative site. FIG. 2 is a section view through the cannula.

The secondary fibre bundle 14 is connected to the cannula 16 at the proximal end 22. Light is proportionally dispersed into the abdominal space from the upper 18 and lower distal tip 20 of the cannula 16, in a similar arrangement to existing light sources provided for standard endoscopes. The intensity of light that is dispersed through the cannula is preset and controlled by the surgeon via an aperture that is embedded within the light distribution junction 12. One reason to control the intensity of light within the operative space is to prevent 'burning out' of the images captured by the endoscope and also to set the intensity of the shadow from the auxiliary light source.

It is advantageous to set the luminance ratio of the main/ auxiliary light source to a low value such that the shadow cast is as faint as possible but can still be detected. The optimal value can be easily set by observing the enhanced shadow online and reducing ratio to a value just above the threshold at which shadow enhancement fails. In practice it has been found in one example that approximately 10% is appropriate for the ratio.

The light distribution junction 12 has three connections ports 24, 26 and 28. The light cable 6 connects to the unit at two points 24, 26. The light is focused by a biconcave lens 28 that focuses the light, optimising the amount that is captured. A beam splitter 30 splits the light into two separate beams.

One beam gets refocused and passes to the secondary light guide at connection port 28 while the second beam gets refocused and passes to the second part of the original light guide that passes to the endoscope. The secondary light cable 14 consists of multiply strands of fibre optics that in turn get distributed within the cannula/port.

Figure 4:
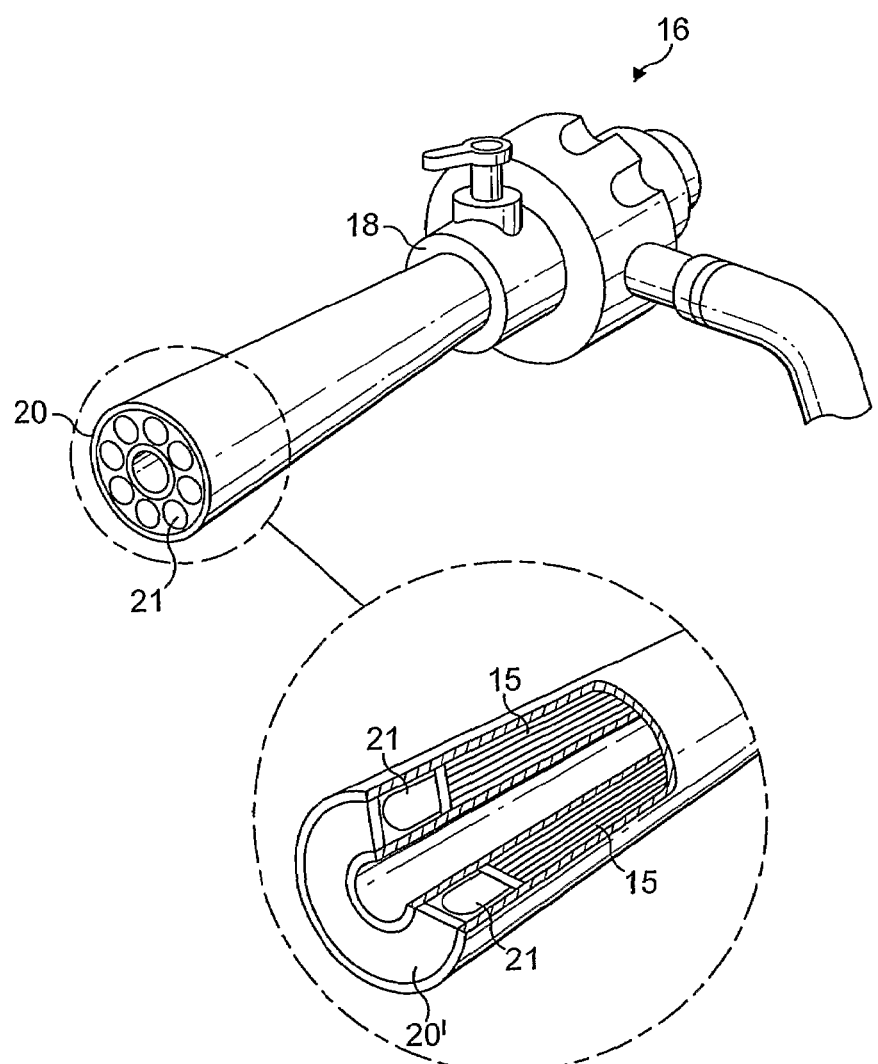
FIG. 4 depicts an alternative cannula.

In an alternative embodiment, the fibre optic bundle 14 of the cannula 16 is replaced with one or more light emitting diodes (LED) 21 which are secured to the cannula at a suitable location. For example LEDs may be located at the position of the ends 18 and/or 20 of the fibre optic bundle 14 of the fibre optic embodiment described above and electrical wire connections 15 may be routed in the same way as the fibre optic bundle 14 in the above embodiments. In the embodiment shown in FIG. 4, the end 20 is protected by a clear plate 20[1]. At the port 22 the LED cannula could then be connected to either a battery pack or another low voltage power source. Preferably, the LEDs omit a substantially white light. Where appropriate, a very bright, single LED may be used.

In this alternative, LED, embodiment, the cost of the system can be advantageously reduced because the light distribution junction 12 and fibre optics cable 14 are no longer required. The intensity of the auxiliary light source equipped with LEDs can, of course, be regulated independently of the intensity of the primary light source which continues to be supplied by the fibre optic bundle 6.

Whether a lamp (e.g. a halogen lamp) and fibre optic bundles, LEDs or any other light source are used for illumination, the colour of the emitted light may be manipulated such that the shadow cast is minimally obstructive in the field of view.

In one particular embodiment, the auxiliary light source is arranged to emit light only in a narrow band, sufficiently narrow in comparison to the main endoscopic light source so that it can be filtered out without too much degradation of the remaining image. At least, the band should be narrower then the bandwidth of the main light source. Alternatively, the light emitted by the auxiliary light source may be substantially entirely in the non-visible spectrum, for example intra-red, such that its removal would not be perceptible to a human observer.

In this embodiment, the system includes a filter, which is arranged to filter out the light from the auxiliary light source in front of the image sensor, whether it is located in the imaging unit or the endoscope. The filter is arranged to pass light from the auxiliary light source when the shadow is being enhanced and to block it otherwise.

It will be understood that the components of the system will have to be adapted for use with the particular wavelength chosen for the auxiliary light source, for example ensuring that the LEDs emit the desired wavelength or that the light guides are suitable for non-variable wavelength guides.

Figure 5:
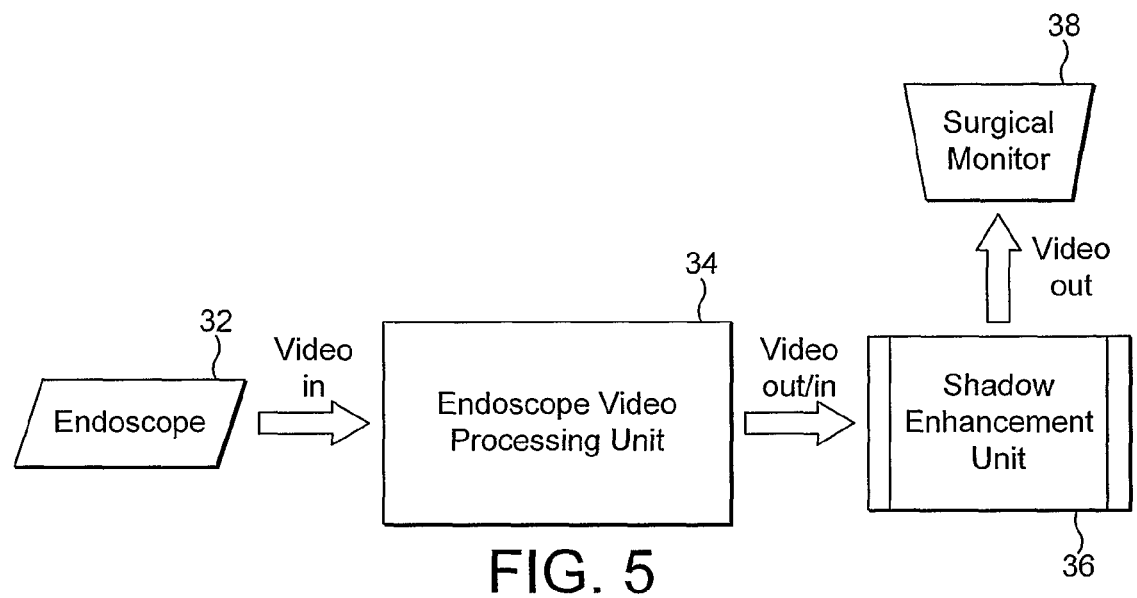
FIG. 5 is a block diagram of a minimally invasive surgery imaging system.

Turning now to FIG. 5, components of the system are depicted as a block diagram. The video input from an endoscope 32 is transferred to an endoscope video processing unit 34 and the output of that unit is input into a shadow enhancement unit 36, the output of which is displayed on a monitor 38. It should be noted that the shadow enhancement unit 36 and the endoscope video processing unit 34 can be housed in one and the same housing and may be implemented using the same hardware or may be separate stand-alone units.

The shadow detection algorithm used by the enhancement unit 36 is described in Lo B P L and Yang G Z; Neuro-fuzzy shadow filter; Lecture notes in computer science: *Proceedings of the 7th European Conference on Computer Vision*, 2002; 2352: 381-392, which is incorporated by reference herein. In summary, the algorithm has two major components, statistical background removal based on the modelling of a temporal probability distribution function of the incoming video stream and shadow filtering. A background image is calculated as the peak of the probability distribution function of each pixel. In order to detect shadow pixels in a current image, four different filters are applied to the current image:

The absolute difference between pixels in the current image and in the background image.

The absolute ratio of pixels in the current image to pixels in the background image.

The angle between RGB vectors of corresponding pixels in the current image and the background image.

A colour invariant filter proposed in E Salvador, A Cavallaro and T Ebrahimi, "Shadow Identification and Classification using Invariant Color Models", Proceedings of the 2001 IEEE International Conference on Acoustics, *Speech and Signal Processing*, vol. 3, 1545-1548, 2001, is also incorporated by reference herein.

Based on the output of each of the four filters, a neuro fuzzy pixel classifier, which has been trained to classify a given pixel as either a shadow pixel or a non shadow pixel, is used to detect shadow pixels. Three fuzzy sets are designed to describe low, medium and high levels of each filter output and the three times four Boolean variables indicating membership of the output of each of the filters in each of the fuzzy sets is used as the 12 node input layer for a multi layer perceptron (MLP) with one, ten hidden nodes, hidden layer and a single output node. The output node represents whether a pixel is a shadow pixel or not. The MLP is trained from image data.

For video sequence processing, it is difficult in practice to perform such training with example data sets. To address this problem, a contextual based training routine for adapting the shadow filter responses based on the following rules can be used:

1) If the outputs of the filters are all "low", the corresponding pixel is a shadow pixel.
2) If the outputs of the filters are all "high", the corresponding pixel is an object pixel.
3) If a shadow pixel is surrounded mainly by object pixels and the outputs of the filters are not "low", the corresponding pixels should be re-classified as an object pixel instead.
4) If an object pixel is surrounded mainly by shadow pixels and the outputs of the filters are not "high", the corresponding pixel should be re-classified as a shadow pixel instead.

For rules (3) and (4), the pixels to be tested depends on the chosen neighbourhood. For an eight neighbourhood setting, "mainly" means that there are at least 5 surrounding pixels that are inconsistent with the classification result of the current pixel. During the processing of the video streams, the above rules are evaluated in real-time. If any of the rules is violated, the MLP is retrained by back-propagation.

It will, of course, be understood, that any other classifier can be used to classify pixels based on the output of the filters described above. Equally, different filters and different methods for shadow detection known in the art, can be applied.

Generally, shadow detection in the known art is used for shadow removal, for example by replacing a pixel determined to be a shadow pixel with the corresponding pixel of the background image. Here, the object is shadow enhancement. This can be achieved in a variety of ways. For example, the pixel which is determined to be a shadow pixel can have its overall luminescence reduced by a pre-set factor or may be multiplied with a pre-set colour vector if a change in the colour of the shadow is desired. This may be useful to correct any hue of the auxiliary light source, in particular when using the LED embodiment described above. Alternatively, pixels determined to be shadow pixels could be set to a predetermined value corresponding to black or predetermined level on a grey scale.

One of the advantageous effects of the present system is that shadow enhancement can be switched on and off at will. Thus, a user could operate a manual switch when shadows are desired in the image to aid navigation and deactivate shadow enhancement when an unobstructed field of view is required for fine manipulation or diagnosis. Alternatively, enhancement could be switched on and off automatically, for example, by detecting movement in the image using known image processing techniques. Another option is to secure a motion detector, for example an accelerometer, to a surgical instrument which is being used for MIS and enhance shadows when movement of the instrument (above a threshold) is detected.

Figure 6:
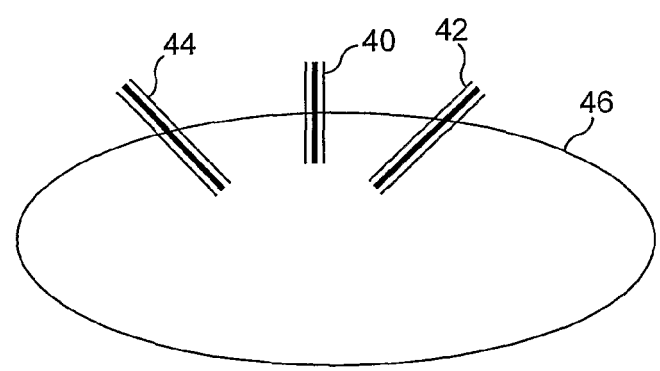
FIG. 6 illustrates schematically the application of the system to a patient.

With reference to FIG. 6, the system described above can be used in a number of configurations. FIG. 6 schematically depicts a patient 46 undergoing a laparoscopic surgery. A cannula 40 provides access for a laparoscope and, in the case of a forward looking laparoscope may act as an additional main light source for the endoscope. In the case of a sideways looking laparoscope, the cannula 40 may also provide an auxiliary light source as described in Schurr et al. Alternatively, cannula 40 may be of a normal type without any light source capability. A second cannula 42 provides access to the patient for a first surgical instrument and a third cannula 44 provides an auxiliary light source, as described above. In the event that a second surgical tool is to be used, cannula 44 may also serve to provide access for the second surgical tool. If, in addition, cannula 42 is also equipped with an auxiliary light source of the type described above, a shadow can be provided for both first and second surgical tools, cannula 44 providing the shadow for the first surgical tool and cannula 42 providing a shadow for the second surgical tool.

While the invention is particularly suitable for surgery in human patients, it is, of course, equally applicable to surgery performed on non-human animals.

The invention is, of course, equally suitable for any non-surgical application where depth perception in a monoscopic or endoscopic field of view, for example of a microscope, is desirable, particularly, although not exclusively, where fine manipulation is required. It is applicable particularly although not exclusively to any field of view in which a main light source does not cast a shadow, for example because its optical axis is aligned with the line of sight of the view.

It is understood that various modifications of the embodiments of the system described above will be evident to a skilled person and that the above description is exemplary only and intended to illustrate the invention. The above description is thus not limiting the scope of the invention, which is defined by the appended claims.

The invention claimed is:

1. An imaging system for use in endoscopic medical procedures comprising:
    an image capture device for capturing images of an endoscopic field of view;
    an elongate member having a light source therein and a cannula for accepting an endoscope or a minimally invasive surgical instrument therethrough, the elongate member operable such that a surgical tool within the endoscopic field of view of the image capture device casts a shadow within the endoscopic field of view of the image capture device; and
    an image processor operatively connected to the image capture device and configured to (i) detect shadow pixels in the images corresponding to the shadow cast by the surgical tool relative to other shadow pixels in the images, and (ii) utilize neuro-fuzzy shadow filtering to enhance the shadow pixels cast by the surgical tool relative to other shadow pixels in the images such that depth perception relative to the surgical tool within the endoscopic field of view of the image capture device is enhanced.

2. An imaging system as claimed in claim 1 which further includes;
    a motion detector operatively connected to the image processor and detect movement of the surgical tool with the field of view based on the received images;
    wherein the image processor is configured to (i) receive the images of the field of view, and (ii) arranged to enhance the shadow only if the motion detector detects movement of the surgical tool above a threshold.

3. An imaging system as claimed in claim 2 in which the motion detector is arranged to detect movement of the object from the captured images.

4. An imaging system as claimed in claim 2 in which the motion detector is operatively connected to the surgical tool to detect movement thereof.

5. An imaging system as claimed in claim 1 in which the image processor includes a set of image filters including an intensity filter and a colour filter and is operable to combine an output of each filter in the set to detect shadow pixels.

6. An imaging system as claimed in claim 1 in which the image processor is operable to enhance the shadow by multiplying the pixel value of shadow pixels by a predetermined factor or by setting it to a predetermined value.

7. An imaging system as claimed in claim 1 including a filter operable to pass light from the auxiliary light source only when the image processor is operative to enhance the shadow and to filter out substantially all of the light from the auxiliary light source when the image processor is inoperative; wherein, preferably, the auxiliary light source is arranged to emit light only in a wavelength band narrower than a wavelength band of a main light source or at non-visible wavelengths.

8. An imaging system as claimed in claim 1 in which the auxiliary light source includes an optical fibre bundle secured at one end of the cannula such as to be operable to illuminate the field of view and at another end to a light distributing junction arranged to split incoming light into a component for a light source of an endoscope and a diverted component for the auxiliary light source.

9. An imaging system as claimed in claim 8 in which the light distribution junction includes a regulator for setting the intensity of the diverted component.

10. An imaging system as claimed in claim 1 including:
    a first cannula with a first instrument disposed therethrough and including a first auxiliary light source; and
    a second cannula with a second instrument disposed therethrough and including a second auxiliary light source;
    wherein the first and second cannula are located relatively to each other such as to produce a shadow of the second and first instrument, respectively.

* * * * *